United States Patent

[11] 3,602,592

[72] Inventor Stanley Hoover Collins
   Guelph, Ontario, Canada
[21] Appl. No. 665,521
[22] Filed Sept. 5, 1967
[45] Patented Aug. 31, 1971
[73] Assignee Canadian Patents and Development Limited
   Ontario, Canada

[54] PRODUCTION OF A MODIFIED ORTHOPHOTOGRAPH
   10 Claims, 16 Drawing Figs.
[52] U.S. Cl. ................................................ 355/77,
   355/22, 33/1, 353/6
[51] Int. Cl. .................................................. G01c 11/10
[50] Field of Search ........................................... 33/1; 353/6;
   355/22, 77

[56] References Cited
   UNITED STATES PATENTS
2,811,445 10/1957 Mahan et al. ................. 96/43

Primary Examiner—John M. Horan
Attorney—Stevens, Davis, Miller & Mosher

ABSTRACT: A three-dimensional optical model is created from a stereo-pair of aerial photographs by projecting the photographs by means of two projectors, and a moving aperture scans the optical model. A photosensitive film is exposed to one of these beams and is shifted in a direction perpendicular to the plane of the film so that the portion of film that is being exposed intersects the optical model. Superimposed on the vertical shift motion of the film is a displacement tangential to the plane of the film, the amount of displacement being in a preselected relationship to the extent of the vertical shift.

INVENTOR
STANLEY HOOVER COLLINS

By Stevens, Davis, Miller & Mosher
ATTORNEYS

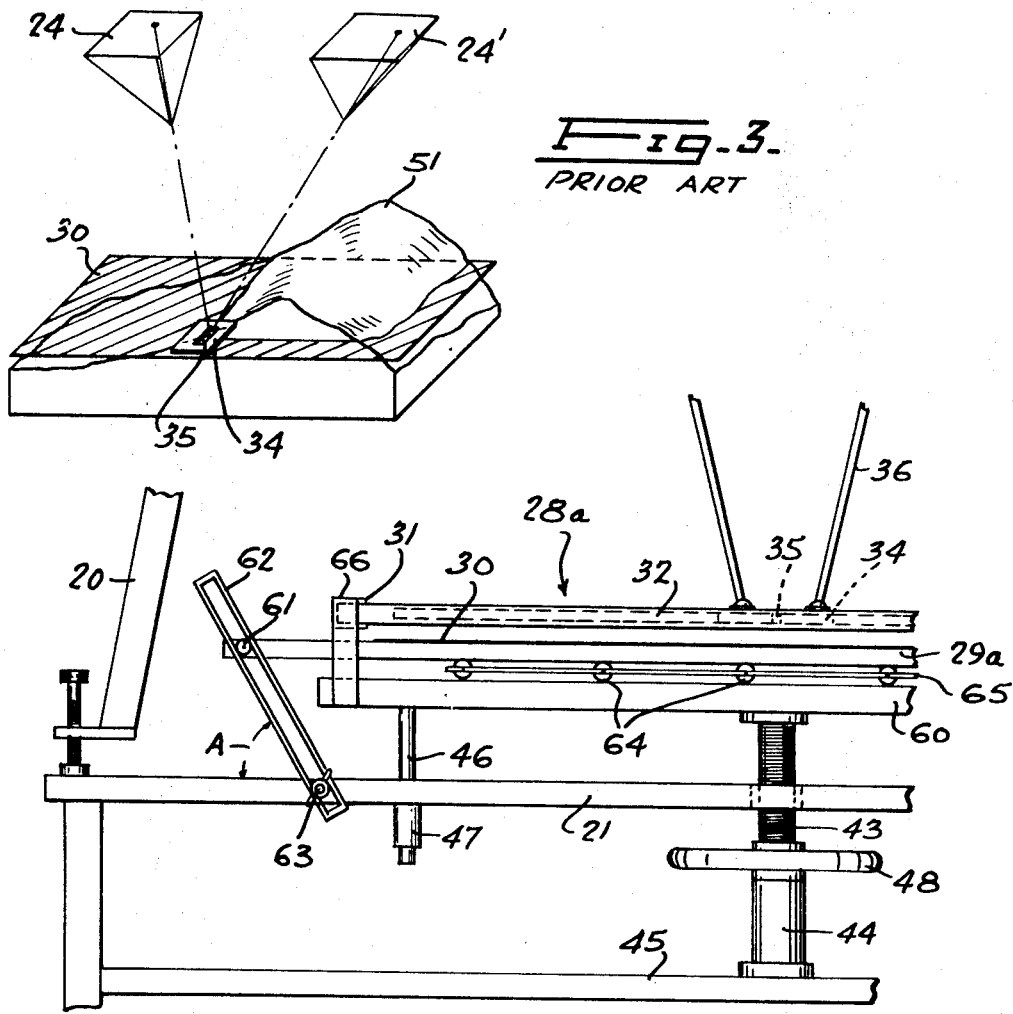
Fig. 3. PRIOR ART
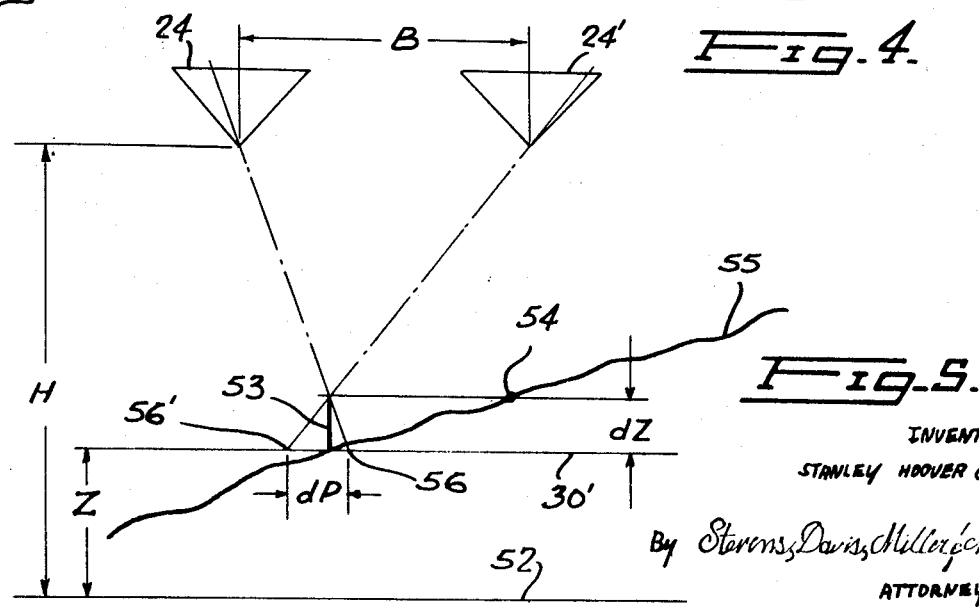
Fig. 4.
Fig. 5.
INVENTOR
STANLEY HOOVER COLLINS
By Stevens, Davis, Miller & Mosher
ATTORNEYS

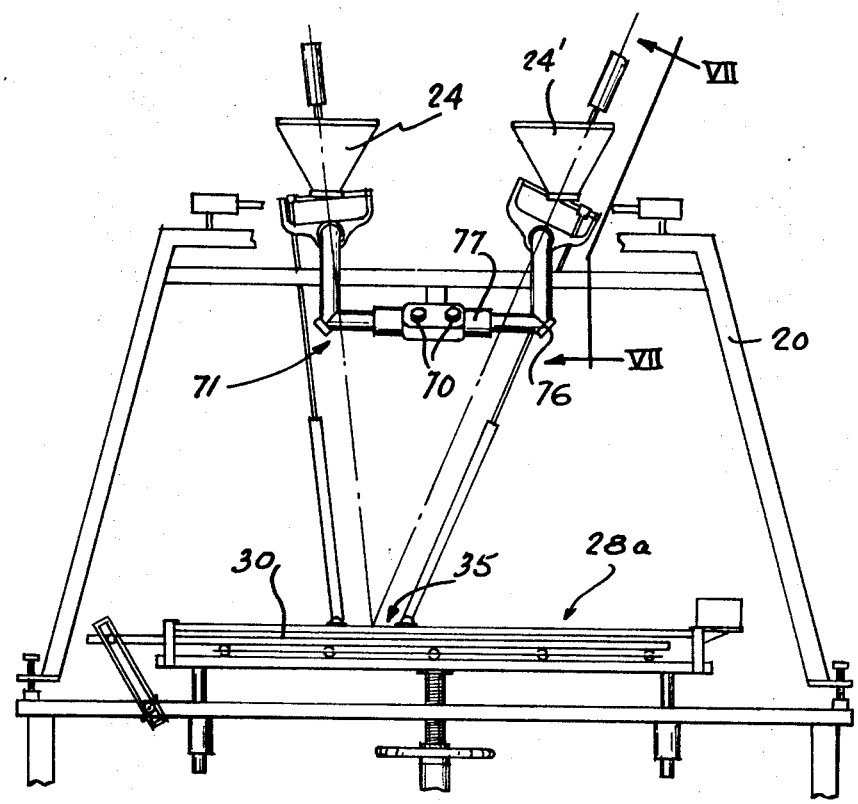
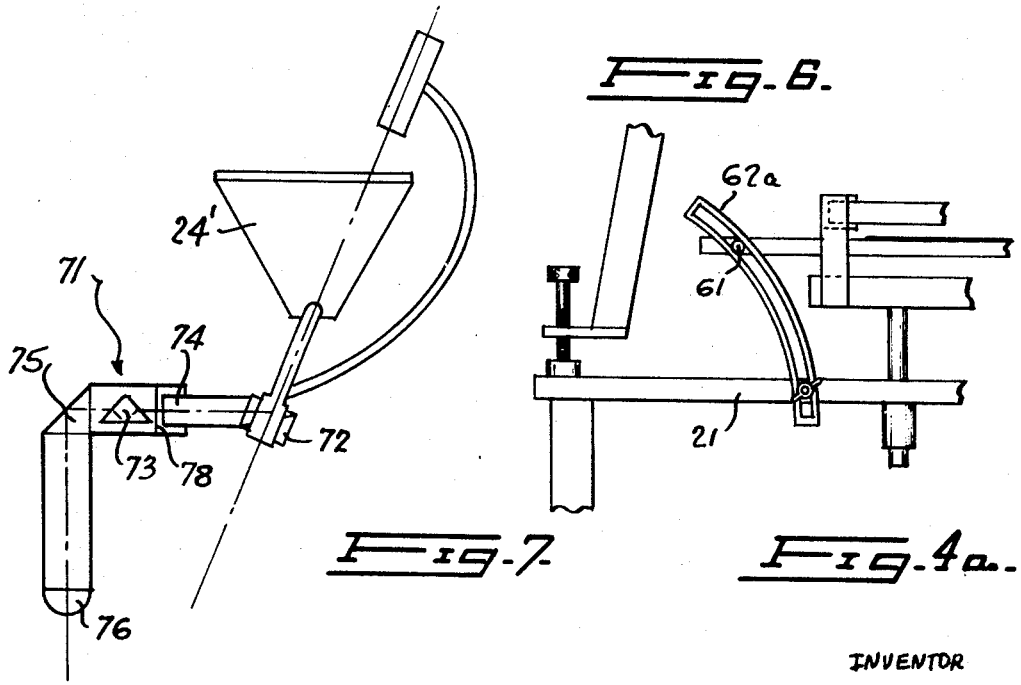

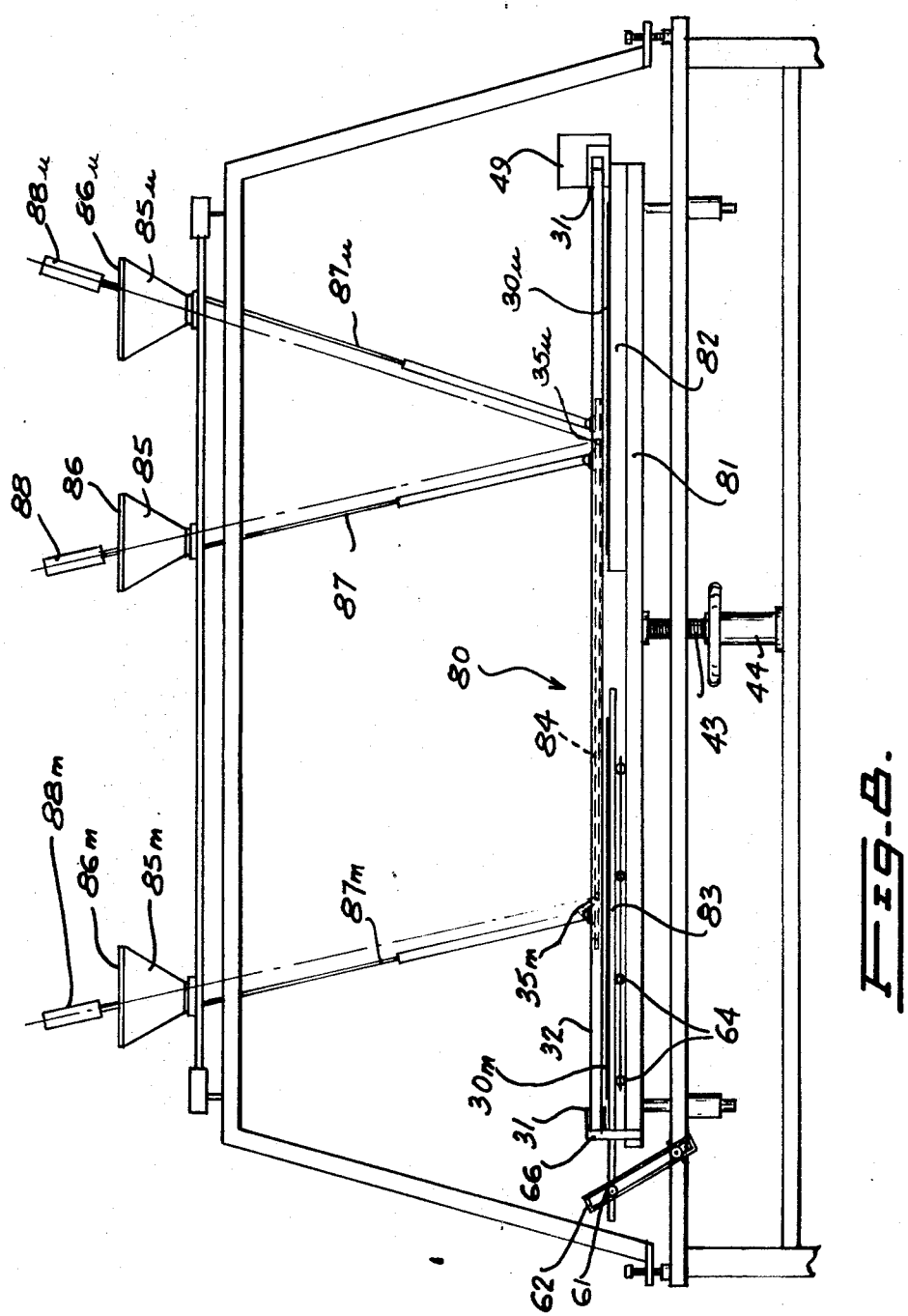

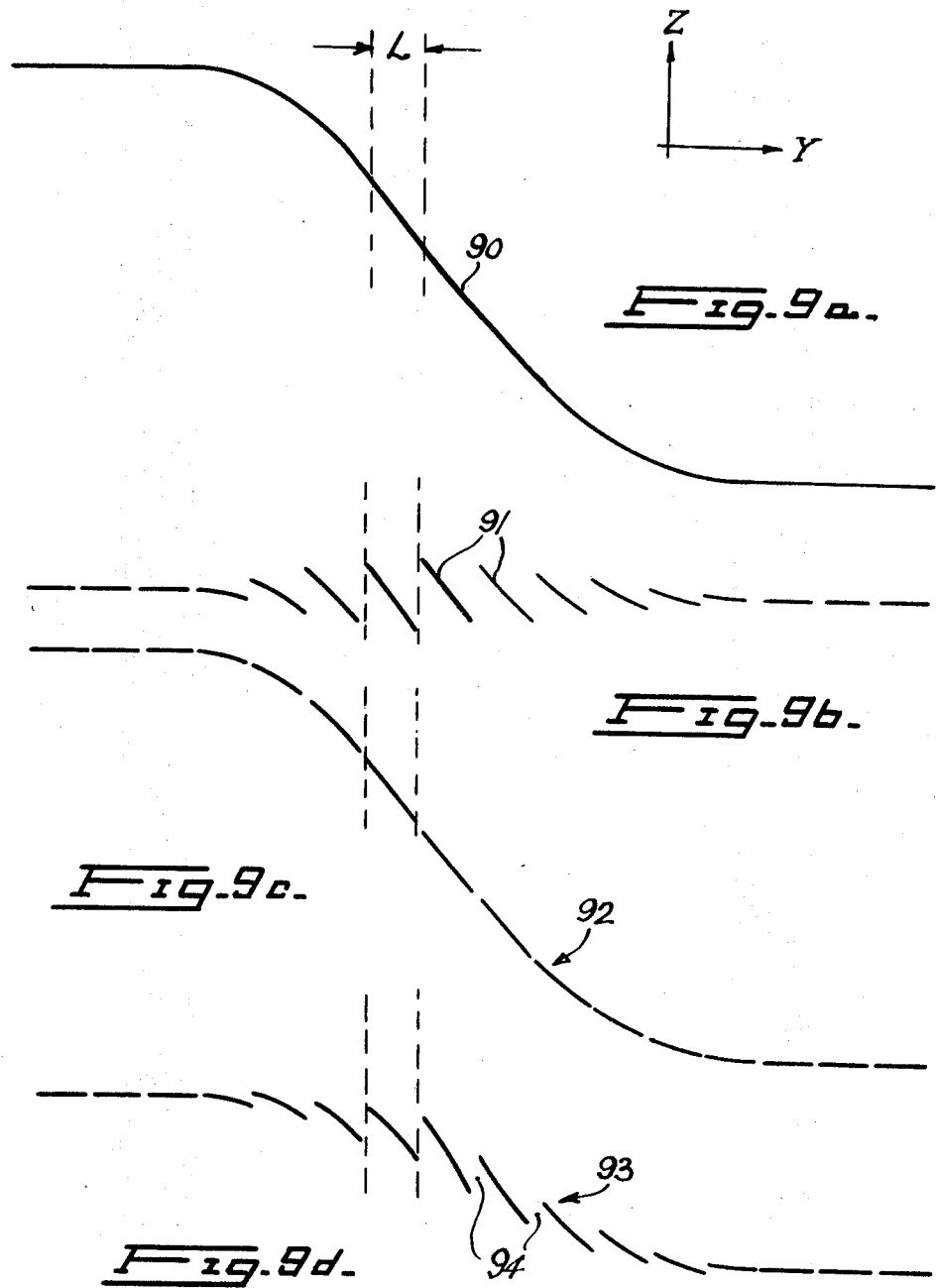

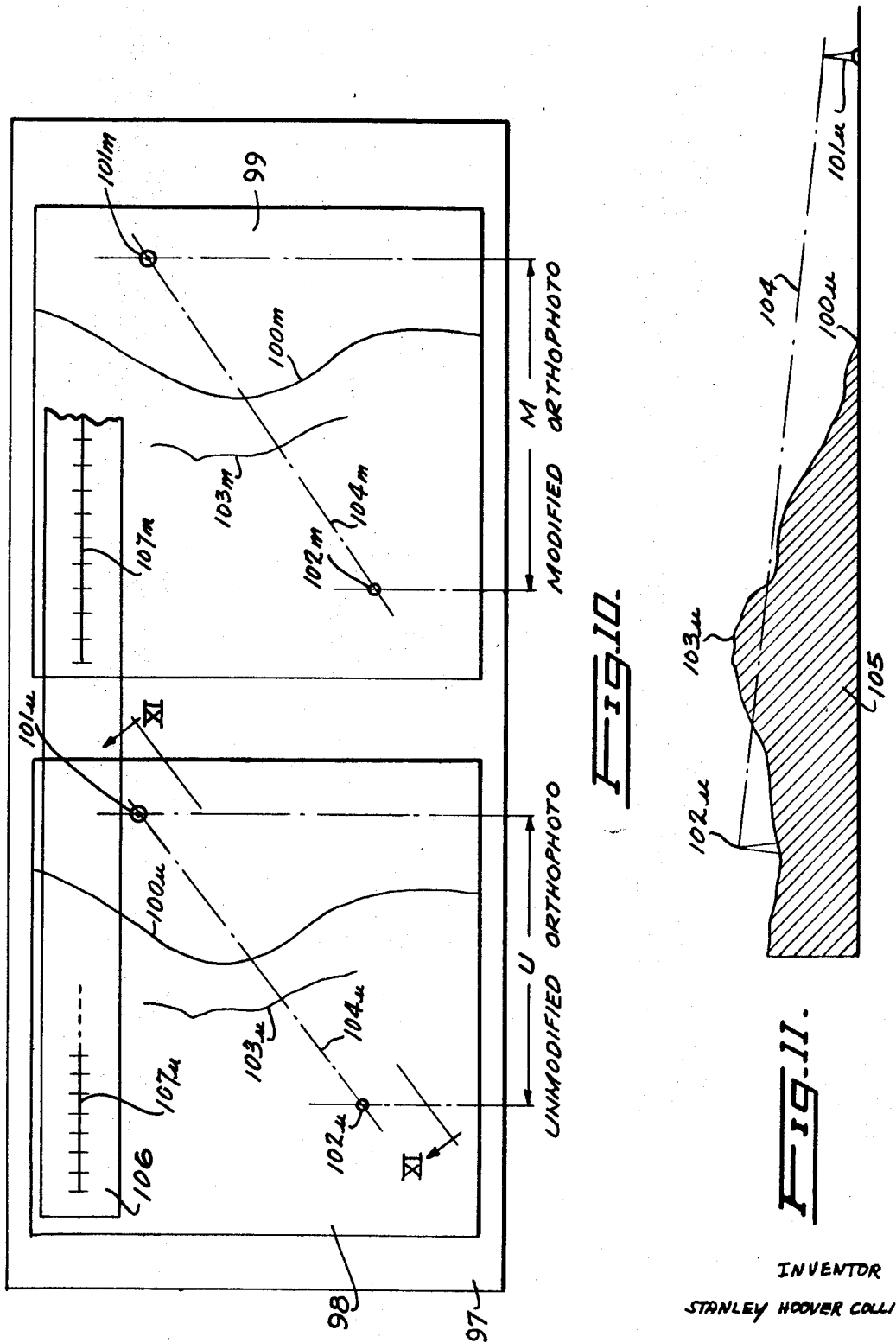

PRODUCTION OF A MODIFIED ORTHOPHOTOGRAPH

This invention relates to the production of photographic maps as used for cartography, photogrammetry and photo-interpretation, more particularly, the invention relates to a method and an apparatus for producing a modified orthophotograph to form, along with an unmodified orthophotograph, a pair of orthophotographs that can be viewed stereoscopically.

The unmodified or true orthophotograph, as known in the prior art, is created from a stereopair of aerial photographs of a terrain. The term "stereopair" is herein used to designate two photographs of the same terrain taken at different angles, so as to be able to create a three-dimensional optical model of the terrain, and, as more fully explained blow, includes a pair of photographs taken in the same direction but at different distances from the terrain. The optical model can be made to appear either in a suitable stereoscope or—and this applies to the present case—at the area of intersection of two beams reflected from or transmitted through the pictures. Normally for the purposes under consideration, the two pictures are photographs taken sequentially from an airplane.

To obtain the aforesaid true orthophotograph, an apparatus is used in which the two stereomates that constitute the stereopair are respectively placed in each of two projectors and are projected to create the optical model. Light filtering devices, such as complementary color filters or polarizers, are provided in the projectors, so that the superimposed images forming the optical model may be viewed through suitably colored or polarized glasses to enable an operator to see the optical model in three dimensions. Alternatively, any means for presenting the images individually to the two eyes of the operator, may be used e.g. the so-called "image alternator." Only a selected one of the aerial photographs is used for creating the orthophotograph, this being done by exposing a photosensitive film disposed on a table to the beam from the selected photograph, while a suitable color or polarizer filter protects the film from exposure to the beam from the other projector. Only a small portion of the film is exposed at one time, the area of this film portion being defined by an aperture that scans the film. The operator shifts the table in a direction perpendicular to the plane of the film so that the film portion that is being exposed is always kept in intersection with the optical model.

The product of this procedure is the orthophotograph, that is, a photographic map with full details of the terrain and every detail ideally represented in its true horizontal position. Thus, any distortion that exists in the selected original photograph, due to the fact that the terrain may not be entirely flat or that each portion of the photograph will not have been taken along a precisely vertical line, is corrected and it now becomes possible accurately to mosaic a plurality of orthophotographs containing adjacent sections of terrain.

Due to this method of producing the orthophotograph which is corrected by elimination of the distortions due to the different elevations of parts of the terrain, the orthophotograph has the inherent disadvantage that overall the terrain appears completely flat and, therefore, does not convey any information about the relative height of details. Evaluation of the orthophotograph is therefore restricted to horizontal measurements. Furthermore, any details, although still rendered in perspective, are difficult to identify or interpret.

To overcome the aforesaid disadvantage an apparatus has already been proposed which produces a so-called "dropped-line" chart. Such a chart normally comprises a plurality of parallel lines each of which may have several sections of different widths, the width of a section of line representing the height of the corresponding detail over a datum plane. To produce the dropped-line chart, however, expensive and complicated equipment is required, in addition to the apparatus for producing the orthophotograph. The dropped line chart itself is produced on a separate sheet and further time-consuming manual procedure is necessary to achieve conventional contour lines from the dropped lines and then to introduce the contour lines into the orthophotograph. Such contour lines are, of course, only an artificial representation of the terrain forms, and besides this fact they will, when directly drawn on the orthophotograph, hide many details. The procedure of drawing contour lines is particularly uneconomical in those cases where no permanent map is required but only specific information, such as details of the distances and slopes between two points, or determination of the area of view or of the lines of sight from a given point.

It is the principal object of the present invention to produce a modified orthophotograph that, when viewed stereoscopically together with a true or unmodified orthophotograph, will create a three-dimensional visual model of the terrain with both horizontal and vertical distances in predetermined scales.

According to the invention a method for producing the modified orthophotograph is provided, in which a displacement of the film tangential to its plane is superimposed upon the above-mentioned perpendicular shift, this tangential displacement being related to the vertical shift in accordance with a predetermined function. Similar to the prior art method, the combined motion of the film is so carried out that at any instant of exposure the film portion that is being exposed intersects the optical model. The function interconnecting the two motions of the film can be linear or not, and specifically it may vary in such a manner that the ratio between the displacement and the shift increases with increasing values of the shift towards the projectors. Preferably, the exposure is performed by continuously scanning the film by an aperture moving in adjacent traces parallel to a scanning direction across the film, the tangential displacement of the film being a translation along this scanning direction.

In the foregoing method, the optical model is a real one produced at the plane of the film. As an alternative, the same effect can be achieved by producing a virtual optical model in a binocular optical system.

As yet a further alternative to these types of visual models where an operator must apply the vertical shift of the film manually to achieve the above-mentioned intersection, according to a further feature of the present invention, the modified orthophotograph can be produced completely automatically. In such a method, no longer is a model of the terrain generated. The diapositives are scanned by two beams emanating from the spot of a CRT to obtain in the form of electrical signals information concerning the parallax of image details. These signals are interpreted by an analyzer to produce output signals that control a further CRT by which a modified orthophotograph is made, such output signals containing the information for application of the equivalent of the above-mentioned tangential displacement.

It is further object of the present invention to provide a device for producing the modified orthophotograph. In a specific embodiment of the invention, this device may comprise facilities for simultaneously producing a true or unmodified orthophotograph as well as a modified orthophotograph. The unmodified orthophotograph is produced from one mate of the stereopair of aerial photographs and the modified orthophotograph from the other stereomate. Each one of such a pair of orthophotographs will hereinafter be referred to as a "stereopartner" to the other.

The present invention will become apparent in more detail from the following disclosure of examples of the invention described with reference to the accompanying drawings.

Figure 1:
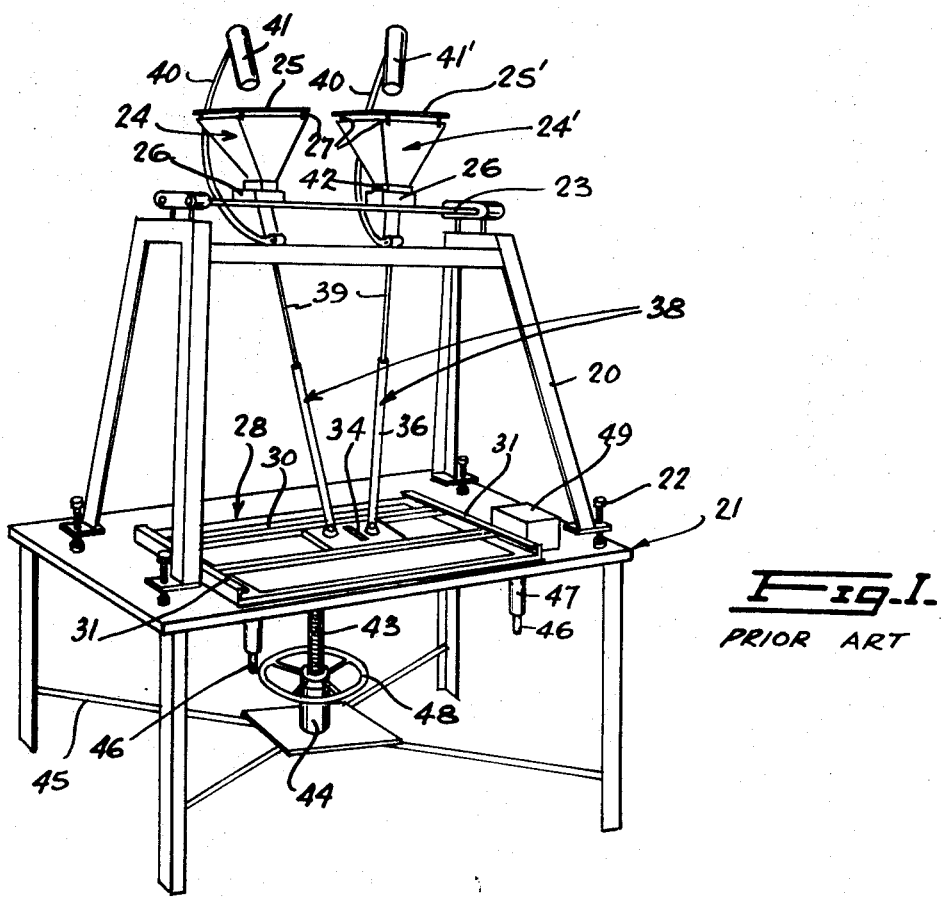
FIG. 1 is a perspective view of a prior art apparatus for producing an orthophotograph.
Figure 12:
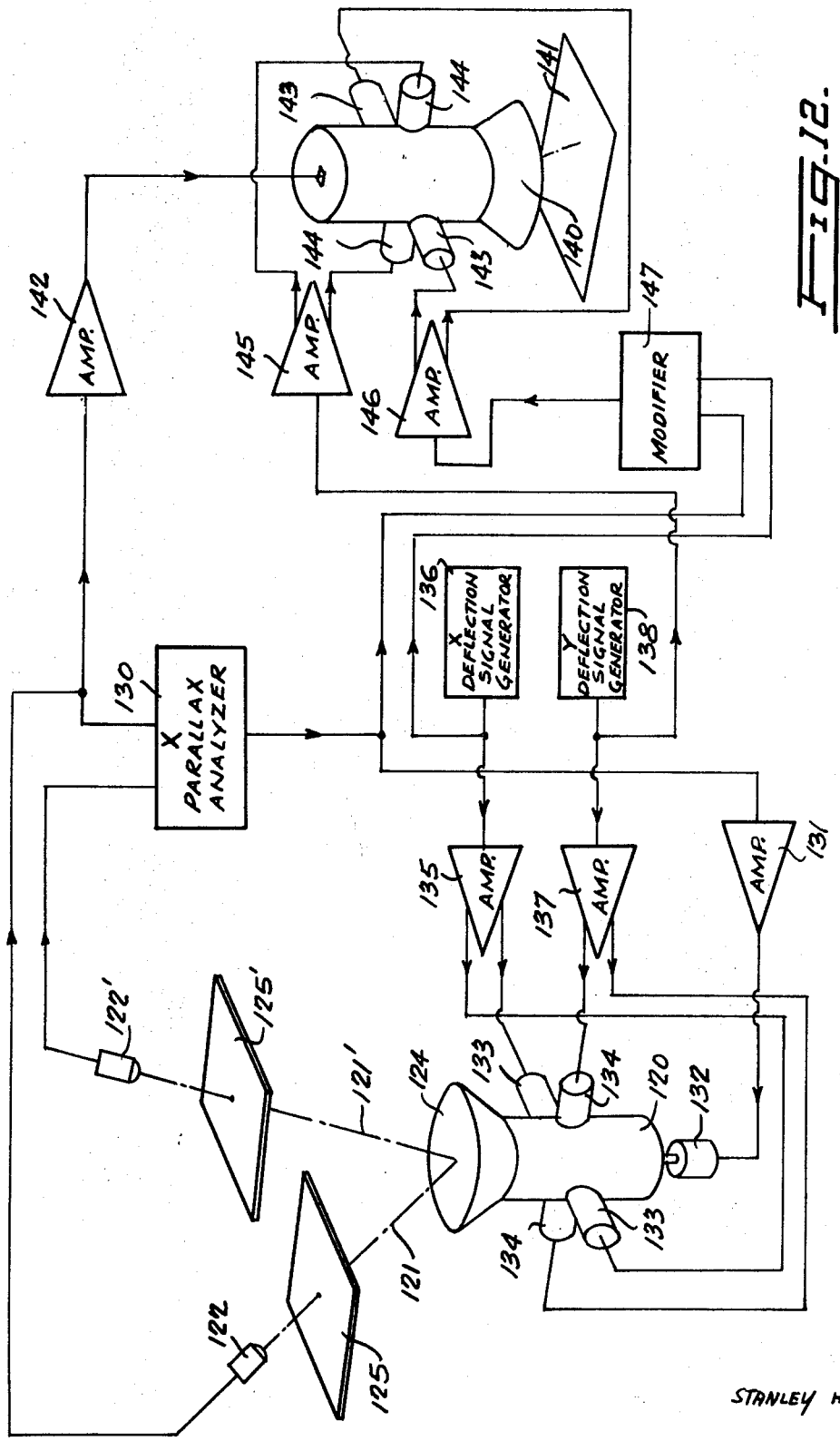

FIG. 3 diagrammatically shows the working principle of the prior art apparatus of FIG. 1;

FIG. 4 is a front view of a portion of the apparatus shown in FIG. 1, modified according to the present invention;

FIG. 4a is a fragment of FIG. 4 showing a modification;

FIG. 5 diagrammatically shows the working principle of the apparatus according to FIG. 4;

FIG. 6 is a front view, with parts broken away, of another embodiment of the present invention;

FIG. 7 is a fragmentary and somewhat diagrammatic side view taken along the line VII—VII in FIG. 6;

FIG. 8 is a front view of a further embodiment of the present invention;

FIG. 9 diagrammatically illustrates different modes of operation of the apparatus according to FIGS. 4, 6 or 8;

FIG. 10 shows an unmodified orthophotograph and its modified stereopartner;

FIG. 11 illustrates a terrain profile taken along the line XI—XI of FIG. 10; and FIG. 12 is a partly diagrammatic view of a further embodiment of the invention.

PRIOR ART–PROCEDURE FOR MAKING UNMODIFIED ORTHOPHOTOGRAPH

Figure 2:
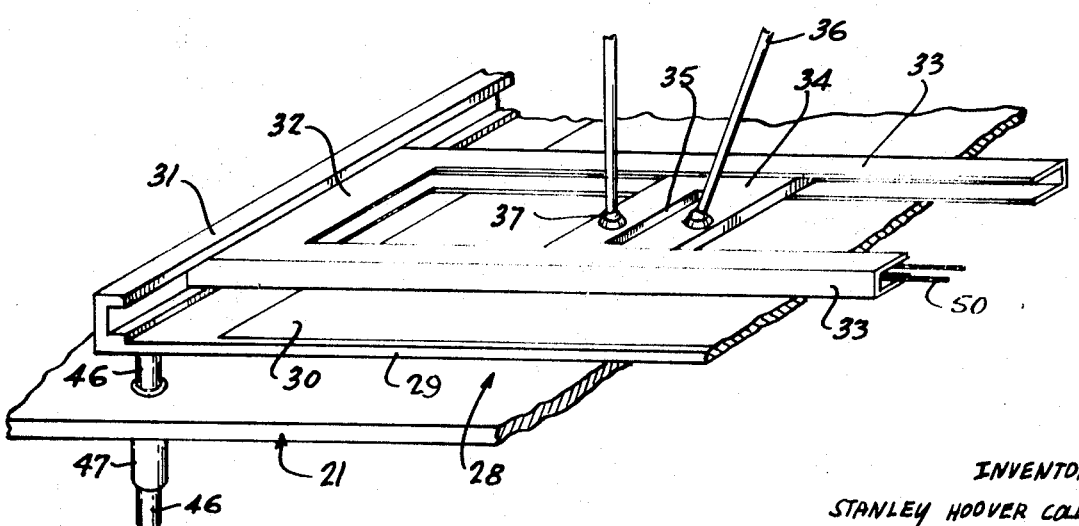
FIG. 2 is a perspective view of a portion of the apparatus according to FIG. 1, shown on an enlarged scale.

(FIGS. 1 to 3)

The prior art device for producing an orthophotograph, as shown in FIG. 1, comprises, in general, a frame 20 which is mounted on a table 21 by means of adjustable legs 22. At the top of the frame 20, there are mounted tracks 23 which carry a pair of optical projectors 24, 24'. Each projector carries a diapositive 25, 25', the images on the diapositive forming a stereopair of aerial photographs with each other. Each projector 24, 24' is supported on a base member 26 which is adjustable along the tracks 23, thereby providing variability of the distance between the two diapositives 25, 25' to enable them to be set in accordance with the distance travelled by the camera between its taking the two aerial photographs. Adjustment screws 27 permit a fine adjustment of the plane of each of the diapositives 25, 25' with respect to the table 21.

The table 21 carries a recording assembly, generally indicated at 28 and shown in more detail in FIG. 2. The assembly 28 comprises a baseplate 29 on the upper side of which a photosensitive layer or film 30 is provided. Bars 31 of a U-shaped cross section are fixed to two opposite parallel edges of the baseplate 29 and form two rails extending in a longitudinal direction which will hereinafter be referred to as the Y-directon. A carriage 32, which is guided in the bars 31 along the Y-direction, comprises a further pair of bars 33 each having a U-shaped cross section and each extending in a direction which will hereinafter be referred to as the X- or scanning direction and which is perpendicular to the Y-direction. The bars 33 guide a mask 34 having a small rectangular aperture 35 in its center. Two cylindrical tubes 36 are each connected to the mask 34 by means of a ball type universal joint 37.

As sown in the overall view of FIG. 1, each of the tubes 36 forms the outer portion of a telescopic rod 38, the upper and inner portion 39 of which is connected to a respective one of the projectors 24, 24' by means of another universal joint (not shown). Connected to the upper portion 39 of each telescopic rod 38 is a support arm 40 which extends around the associated projector 24, 24' and carries on its upper end a projection lamp 41, 41'. If the mask 34 is moved across the film 30 along the X- and Y-directions, each of the telescopic rods 38 remains parallel to the beam of light that is emitted by the respective projection lamp 41, 41' which beam extends through a specific small area of the diapositive 25, 25', a projection lens disposed in the lower part 42 of the projector 24, 24' and the aperture 35 in the mask 34, being focused on the film 30.

The entire recording assembly 28 is shiftable in a vertical direction, which is hereinafter referred to as the Z-direction. To achieve this shift, the upper end of a threaded spindle 43 is mounted on the bottom side of the baseplate 29. This spindle 43 cooperates with a threaded sleeve 44 rotatably mounted on cross bars 45 of the frame of the table 21 and controlled by a handwheel 48. It is important to the production of accurate orthophotographs that the film 30 is shifted perpendicularly to its own plane and that the plane of the film 30, on which the orthophotograph is produced, is set parallel to a selected datum plane in the optical model, corresponding to a given (usually horizontal) plane in the terrain of which the photographs were taken. To obtain this result, there are four guide rods 46 mounted on the corners of the baseplate 29 and extending downwardly therefrom along the Z-direction. The four guide rods 46 cooperate with four guide sleeves 47 connected to the table 21.

In operation, the beams of light illuminating corresponding areas of the two diapositives 25, 25', create at their area of intersection a three dimensional optical model. The beam of one of the projection lamps, e.g. the projection lamp 41, passes through a red colored filter which may be disposed either in the lamp itself or in the lower part 42 of the projector 24, while the other beam passes through a green colored filter. As a result, when the two focused beams of light at the aperture 35 are viewed by an operator through spectacles having suitably oriented red and green glasses, he is able to see the three-dimensional optical model there formed. While the mask 34 with the aperture 35 scans the film 30, the operator shifts the recording assembly 28 vertically by rotating the hand wheel 48 so that the area of the film 30 that is being exposed through the aperture 35 always intersects the optical model 51, as is diagrammatically shown in FIG. 3. It is to be understood that, while the two projectors 24, 24' are required to create the three-dimensional optical model 51, the film 30 is only exposed to one of the beams of light passing trough either of the diapositives 25, 25'. Therefore, the film 30 must be sensitive to the color of the selected beam (e.g. green) and in sensitive to the color of the other beam (red).

A motor and drive unit 49, which is mounted on the recording assembly 28, automatically performs the scanning and indexing of the mask 34 across the film 30. The operation starts with the mask 34 at one end of the carriage 32 and with the carriage 32 at one end of the bars 31. By means of cables 50 (FIG. 2) running within the channel of one of the U-shaped bars 33 and connected to the mask 34, the latter is moved in the X- or scanning direction until it reaches the other end of the carriage 32. At this moment the drive unit 49 indexes the carriage 32 in the Y-direction by an amount equal to the length of the aperture 35 and reverses the motion of the mask 34, such indexing being performed by cable means (not shown) provided within the channel of one of the U-shaped bars 31, similar to the cable 50. The same procedure repeats when the mask 34 returns to the first end of the carriage 32. Instead of scanning the film 30 in both senses of the X-direction, it is better to scan only in one sense and return the mask 34 without exposing the film, because of the apparent vertical shift that occurs, when the sense is reversed, and which shift introduces errors in the actual vertical shift of the recordings assembly 28. While the film is exposed to the respective portions of the diapositives, the motion of the mask 34 is transferred to both of the projection lamps 41, 41' by means of the telescopic rods 38.

It is important for the production of an accurate orthophotograph that the angle between each of the planes of the diapositives 25, 25' and the plane of the film 30 is the same as the momentary angle between the photographing camera in the airplane and the assumed datum plane of the terrain, which datum plane will in most applications be taken as horizontal.

The image produced on the film 30 in the above-described apparatus is a true or "unmodified" orthophotograph.

PROCEDURE FOR MAKING MODIFIED ORTHOPHOTOGRAPH

(FIG. 4)

Fig. 4 shows a detail of the same apparatus modified so as to produce a modified orthophotograph according to the present invention. In FIG. 4, a baseplate 29a carrying film 30 is movably mounted on a mounting plate 60. The bars 31 with the carriage 32 and the mask 34 are directly supported on the mounting plate 60. Similar to the above-described construction, a threaded spindle 43 is fixed to the bottom side of the mounting plate 60 and engages a threaded sleeve 44 which is mounted on the cross bars 45 of the table structure and is rotatable by the handwheel 48. Guide rods 46, which cooperate with guide sleeves 47 fixed to the table 21, serve to maintain orientation of the plate 60 of this modified recording assembly 28a when the plate 60 is shifted in the Z-direction.

One edge of the baseplate 29a projects in the X-direction and is provided with a follower 61 that is freely rotatable about an axis extending in the Y-direction. The follower 61 engages a cam rail 62, which is disposed in a plane perpendicular to the Y-direction and has a preselected angle A with respect to the X-direction by virtue of such rail 62 being attached to the table 21 by means of a wingbolt 63. Between the baseplate 29a and the mounting plate 60, there are a plurality of rollers 64 retained in and spaced by a cage 65 so that each of the rollers is rotatable about an axis parallel to the Y-direction. As a result, the baseplate 29a is movable on the mounting plate 60 along the X-direction.

In operation, the operator shifts the recording assembly 28a along the Z-direction by means of the hand wheel 48 so as continually to keep the portion of the film 30, that is being exposed through the aperture 35 in the mask 34, intersecting the optical model. As the mounting plate 60 is shifted upwardly in the Z-direction, the follower 61 travels along the cam rail 62 and displaces the baseplate 29a relative to the mounting plate 60 to the left in the X-direction. In the embodiment according to FIG. 4 the bars 31 receiving the carriage 32 are connected to the mounting plate 60 by means of straps 66 rather than to the baseplate 29a so that the horizontal displacement generated by the cam rail 62 is transmitted only to the baseplate 29a and the film 30, while the scanning and indexing of the mask 34 is unaffected. As a result, the modified orthophotograph produced by such a device differs from the unmodified orthophotograph produced by the above-described prior art device in that every small portion exposed through the aperture of the mask 34 is displaced in the X-direction by an amount depending on the elevation of the detail depicted in that small portion relative to the datum plane selected in the terrain.

The X-direction along which the film 30 horizontally displaced with respect to the diapositives 25, 25' should be approximately parallel to the image of the flight direction of the airplane in the optical model, i.e. the direction along which the aerial photographs have been taken sequentially. Only with such a disposition will a stereoscopic image permit simultaneous stereoscopic vision of the overall terrain as well as of every detail.

THEORETICAL CONSIDERATIONS (FIGS. 4, 4a, 5 and 9a to d)

The relationship between the shift of the recording assembly 28a in the Z-direction and the displacement of the baseplate 29a with the film 30 in the X-direction is determined by the angle A between the cam rail 62 and the table 21 and can easily be varied by turning the cam rail around the bolt 63. During the production of an individual modified orthophotograph, however, the setting of the cam rail 62 will be maintained, and therefore, the parallax introduced for any points of the terrain will vary linearly with their respective elevations above or below the datum plane. With reference to FIG. 5, 55 is a profile section of the terrain taken along the X-direction with 53 indicating an upstanding (i.e. extending in the Z-direction) pole of a height $dZ$ and located at an elevation Z above the datum plane 52. If the vertical shift of the film when scanning through the pole 53 is made equal to Z so that the portion on the film at which the pole 53 is to be depicted intersects the terrain 55 at the foot of the pole, the top of the pole will appear in the plane 30, in which the film lies, at a point 56 in a picture produced from the projector 24 and at a point 56' in a picture produced from the projector 24'. The distance between the points 56 and 56' in these two pictures is the parallax $dP$ for the top of the pole 53, which is determined for any given portion of the terrain by the different angles at which the aerial photographs were taken, and which is independent of any motion of the film. For reasons that are described fully below in connection with FIGS. 9a to d, it is desirable that the parallax of the points of the terrain 55, which is artificially introduced into the modified orthophotogaph by horizontal displacement of the film, should match the above described inherent parallax of a detail height. In order to achieve this effect the angle A of the cam rail 62 (FIG. 4) must be so selected that a point 54 on the terrain located at an elevation $dZ$ above the foot of the pole 53 appears horizontally offset in the X-direcbon from its true horizontal distance from the pole by the value $dP$.

Based on these considerations, the required angle A for the cam rail 62 is obtained from the expression $\cot A = dP/dZ = B/H - Z;$ where $B$ = the horizontal distance between the projector lenses (along the X-direction);

$H$ = the vertical distance of the datum plane from the projector lenses;

$Z$ = the momentary reference distance of the film from the datum plane.

If the above equation is integrated, the result is $P = B \ln H/H - Z$ ($\ln$ = natural logarithm) indicating that the relationship between the parallax P and the distance Z is actually a logarithmic one rather than linear. Assuming that the average flying height above the terrain is large compared with the variations in elevation of the terrain, i.e. in the reduced model of FIG. 5 that H is large compared with z, Z may be neglected in the above equation, and this equation becomes a linear one, resulting in a straight cam rail 62 as shown in FIG. 4. In those cases, however, where this assumption does not apply, particularly in mountainous terrain, the expression will become a logarithmic function of the elevation Z of the terrain, and the resulting mechanical embodiment will require a cam rail 62a to be curved accordingly (FIG. 4a).

It is also possible to derive from FIG. 5 the sense in which the film is to be displaced horizontally in the production of the modified orthophotograph. In the event that the unmodified orthophotograph is taken from the right hand projector 24' and the modified orthophotograph from the left hand projector 24, the image point (such as 56) of a detail portion elevated above the terrain (as the top of the pole 53) will in the modified orthophotograph appear displaced to the right from the corresponding location of the image point (56') of the same detail portion in the unmodified orthophotograph. In order to obtain the result, that a point in a higher area of the terrain (as point 54), which appears at its true location in the unmodified orthophotograph, be displaced in the same sense, namely to the right, in the modified orthophotograph, the film itself on which the modified orthophotograph is produced has to be shifted to the left.

FIGS. 9a to d illustrate the influence on the appearance of the terrain, when the unmodified and the modified orthophotographs are viewed stereoscopically, of the ratio of the horizontal displacement $dP$ and the vertical shift $dZ$ of the film on which the modified orthophotograph is produced. FIG. 9a shows the true shape of a slope 90 extending in the Y-direction, i.e. in the direction perpendicular to the scanning direction. If no horizontal displacement is applied, that is to say if two unmodified orthophotographs are produced, one from each mate of the stereopair of aerial photographs, and these two orthophotographs are viewed stereoscopically, the general terrain will appear flat, because, by definition, any given terrain point will appear at the same place in every true orthophotograph. Thus two true orthophotographs cannot display the relative parallax needed to give an indication of a difference in elevation. Any details, however, smaller than the scanning aperture will be seen in stereoscopic depth. Assuming that the center of the scanning aperture is maintained accurately to intersect the three-dimensional optical model, the stereoscopic appearance that results is a series of inclined portions 91 (FIG. 9b) each parallel to the surface of the optical model, i.e. each generally parallel to the corresponding portion of the slope 90. Each of the potions 91 belongs to a different scanning row and has a length equal to the length L of the aperture 35 in the Y-direction.

When a horizontal X-displacement is used, i.e. one of the orthophotographs is modified, a smooth stereoscopic representation 92 of the overall terrain according to FIG. 9c is obtainable, provided that the ratio dP to dZ matches the parallax of the detail. Any other ratio will result in a stereoscopic terrain representation 93 (FIG. 9d) in which the overall slope is too shallow (or too steep) and which includes discontinuities 94 between the various portions of the overall representation 93 i.e. between the scanning rows.

The exposing of the film 30 can be done step-by-step with the mask 34 being moved relative to the film after each exposure by an amount equal to the width of the aperture 35. The preferred operational mode, however, is the continuous exposing mode in which the mask 34 is scanned along the carriage 32 in the X-direction, and the carriage is indexed in the Y-direction after each completed scanning row.

ALTERNATIVE PROCEDURES

Because the film is displaced horizontally in the X-direction the speed of the aperture 35 relative to the film is not constant and, therefore, the time of exposure of the different portions of the film 30 varies with the elevation of the respective areas of the optical model. Such variation can easily be compensated for by controlling the brightness of at least the selected one of the projection lamps 41, 41' according to the horizontal displacement of the film 30; to this purpose, a potentiometer could be provided in the power supply for the projection lamp or lamps, the slider of the potentiometer being coupled to the baseplate 29a. If, on the other hand, the brightness of the orthophotograph is not equalized, a further effect is obtained which may assist in interpretation when viewing the modified orthophotograph together with an unmodified one, since all slopes facing in one direction will appear brighter than the slopes facing in the opposite direction.

Instead of fixing the strap 66 to the mounting plate 60, as shown in FIG. 4, the strap can be secured to the baseplate 29a. With such a construction, the bars 31, the carriage 32 and the mask 34 follow the horizontal displacement of the baseplate 29a. Provided that the motor and drive unit 49 is fixed to one of the bars 31, as shown in FIG. 8, the scanning motion of the aperture 35 relative to the film 30 is now uniform and independent of the vertical shift of the recording assembly 28a.

The image produced on the film 30 in the device shown in FIG. 4 is a modified orthophotograph according to the present invention.

As described above, the production of the modified orthophotograph can be performed simultaneously with the scanning of the optical model. However it has already been proposed either manually or even automatically to scan the optical model in a first step, thereby storing the entire terrain point-by-point with associated information about the X-, Y- and Z-coordinates of each point, such information being stored in any suitable recording medium, e.g. the memory of an analog computer. For producing the orthophotograph, the stored information is then transmitted to corresponding drive circuits for exposing and scanning the film on which the orthophotograph is to be produced. It is apparent that such a process can easily be modified to produce a modified orthophotograph according to the invention. With a given relationship between dP and dZ the computer can be programmed to modify the information about each X-coordinate by a value depending on the associated Z-coordinate in accordance with the above equation.

SECOND EMBODIMENT

(FIGS. 6 AND 7)

FIG. 6 shows a different embodiment of the apparatus according to the invention. In this apparatus the three-dimensional optical model is not a real one which intersects the plane of the film 30 as described above; instead it is a virtual optical model apparent only wen the operator simultaneously views a pair of images by means of the binoculars 70 of an optical system 71 which is provided in this embodiment. This optical system per se is the invention of T. J. Blachut et al. and is the subject of U.S. Pat. No. 3,486,820 issued Dec. 30, 1969.

According to FIG. 6 and FIG. 7 the optical system 71 consists of two nearly identical halves, each half corresponding to a respective one of the projectors 24, 24' and comprising essentially a half-transparent mirror 72, a Dove-prism 73 disposed in a tube 74 telescopic along the Y-direction, further prisms 75 and 76 and a second tube 77 telescopic along the X-direction and connected to each respective eyepiece of the binoculars 70. In order to prevent rotation of the images visible in the binoculars 70, each of the half-transparent mirrors 72 is rotatably mounted about an axis parallel to the X-axis, i.e. an axis perpendicular to the plane in which FIG. 7 is taken, but at half the angular speed of travel of the aperture 35 in the scanning direction. Similarly, the Dove-prism 73 is rotated about an axis parallel to the Y-axis, i.e. an axis perpendicular to the plane in which FIG. 6 is taken, at half the angular speed of travel of the aperture 35 in the indexing direction. Each half transparent mirror 72 splits the ray emanating from the projector 24, 24' to produce a transmitted part of the light which is focused on the aperture 35 and a reflected part of the light which produces an image at a location within the tube 74. A similar image is formed at a corresponding location in the other part of the optical system 71. These images are viewed stereoscopically by means of the binocular pair of eyepieces 70 to produce a small portion of a virtual three-dimensional optical model. The model appears in space, being movable along the tube 74 with rotation of the mirrors 72 that results from vertical shifting of the film 30. A diaphragm 78 containing a measuring mark is disposed in each tube 74, and this mark also appears stereoscopically to the operator, floating above or below the terrain He moves the film 30 to move the optical model until the measuring mark appears to lie in the plane of the detail of the optical model under consideration.

Since only the beam from the projector 24' is used to expose the film 30, the half-transparent mirror 72 associated with the other projector 24 may be replaced by a full mirror.

The main advantages of this second embodiment consist in a. that the area of the virtual optical model to be observed appears always at the same location in the apparatus without regard to any horizontal or vertical motion of the recording assembly 28a, since the binoculars 70 are rigidly connected to the frame 20;

b. and that no colored filters or polarizers are required, since only the beam of one of the projectors 24' need be directed to the aperture 35.

STRUCTURE OF THE THIRD EMBODIMENT

(FIG. 8)

In FIG. 8 an apparatus is shown which permits the simultaneous production of a true or unmodified orthophotograph as well as of a modified orthophotograph in one scanning and indexing operation. Such an arrangement will not only save time but also prevent false differences in apparent terrain elevation due to the fact that the operator may introduce varying amounts of error in successive operations. According to FIG. 8, a recording assembly 80 comprises a mounting plate 81 which is shiftable in the vertical or Z-direction by means of a threaded spindle 43 engaging a threaded sleeve 44 and which carries two baseplates 82 and 83 in a side-by-side relationship along the X axis, each of the baseplates 82, 83 supporting a film 30u and 30m respectively. The baseplate 82 is fixed to the mounting plate 81, while the baseplate 83 is supported so as to be displaceable in the X-direction by means of a number of juxtaposed rollers 64. A follower 61 provided at one end of the baseplate 83 and engaging a cam rail 62 displaces the baseplate 83 in the X-direction, as the recording assembly 80 is shifted in the Z-direction. Two bars 31 having a U-shaped cross section and extending parallel to the Y-direction are provided above both both edges of the mounting plate 81. In FIG. 8 the right hand bar 31 is secured to the right hand edge of the fixed baseplate 82, while the left hand bar 31 is connected to the left hand edge of the mounting plate 81 by means of a strap 66. A carriage 32 is movable in the Y- or indexing direction along the bars 31, and within the carriage 32 a mask 84 is movable in the X- or scanning direction. The indexing of the carriage 32 and the scanning of the mask 84 are performed automatically by means of a motor and drive unit 49 and suitable cable means (not shown). The parts of the recording assembly 80 so far described represent a combination of the prior art recording assembly 28 according to FIG. 2 and the recording assembly 28a according to the invention as shown in FIG. 4.

Similar to the above-described prior art apparatus, there are two projectors 85 and 85u disposed above the right hand film 30u. Two diapositives 86 and 86u forming a stereopair of aerial photographs with each other are placed in the projectors 85 and 85u respectively. Two telescopic rods 87 and 87u control the scanning of the diapositives 86 and 86u by the projection lamps 88 and 88u, respectively, according to the motion of the mask 84. A third projector 85m is provided above the film 30m which is supported on the horizontally movable baseplate 83. The average distance between the center points of the films 30m and 30u is equal to the distance of two apertures 35m and 35u provided in the mask 84, and this latter distance is equal to the distance between the lenses of the tow projectors 85m and 85. The diapositive 86m placed in the third projector 85m is identical to the diapositive 86 and it is scanned by a projection lamp 88m controlled by a telescopic rod 87m. It is important that the two projectors 85 and 85m with their diapositives 86 and 86m are equally oriented and disposed at the same height relative to the respective film planes.

OPERATION OF THE THIRD EMBODIMENT (FIG. 8)

An unmodified orthophotograph will be produced on the right hand film 30u, and, simultaneously, a modified orthophotograph on the left hand film 30m. As stated above, any error in the vertical shift of the mounting plate 81 will apply to the modified as well as to the unmodified orthophotograph. It may be demonstrated that under this simultaneous scanning small errors in the height at which the scan is performed will not produce any apparent difference in the elevation of the terrain.

In the device shown in FIG. 8, the three-dimensional optical model is produced by the projectors 85 and 85u and will appear at a location to intersect the plane of the film 30u. As described above, the recording assembly 80 is shifted in the vertical direction so that any instant of exposure the area of the film that is being exposed through the aperture 35u is kept in intersection with the three-dimensional optical model. For the exposure of the film 30u itself, only the beam passing through the diapositive 86u is used. Since the diapositive 86m is identical to the diapositive 86 the same vertical shift must apply to the production of the unmodified as well as the modified orthophotograph. It is, therefore, of importance that the films 30u and 30m are maintained in the same place.

In order that, when viewing the resultant modified and unmodified orthophotographs stereoscopically, not only the overall terrain will appear three-dimensional, which fact is due to the horizontal displacement of the film 30m, but also the stereoscopic appearance of the details will be maintained, It is necessary that the unmodified orthophotograph be produced from one mate of the stereopair of aerial photographs and the modified orthophotograph from the other stereomate.

Since both of the apertures 35u and 35m are provided in the same mask 84 and are, therefore, moved at the same speed, the speed of the aperture 35m relative to the film 30m varies with the horizontal displacement of the baseplate 83, and the above-described means for controlling the brightness of the projection lamps may be provided.

It is also possible to equip the device shown in FIG. 8 with the optical system 71 used in the arrangement of FIGS. 6 and 7.

It is furthermore possible to operate the device of FIG. 8 having only two projectors 85 and 85u. Suitable further optical means will then be necessary. For example, a half transparent mirror can be disposed in the ray emanating from the projection lamp 88 such that the transmitted part of said ray passes through the aperture 35u, while the reflected part is re-reflected in a direction parallel to the transmitted part and so as to pass through the aperture 35m. Such a device has the inherent advantage that no differences between the two diapositives 86 and 86m, nor between their disposition relative to the respective films, can occur.

FOURTH EMBODIMENT (FIG. 12)

In Canadian Pat. No. 729,857 granted March 15, 1966 to Gilbert L. Hobrough an automatic stereoplotting system is described which may be modified and used for carrying out the present invention. The modified system is illustrated in FIG. 12. To a certain extent, the working principle of this system can be considered an inversion of the principle of the above described manual scanning systems. As before, a stereopair of aerial photographs of the terrain is provided in the form of two diapositives 125, 125' disposed in a side-by-side relationship along the X-direction and in the same plane, which plane is parallel to the screen 124 of a cathode-ray tube 120. The above-described three-dimensional optical model of the terrain no longer exists as a real and visual one, but for a better understanding of this embodiment, one has to imagine a notional three-dimensional model at the screen 124 of the CRT 120, with the screen being disposed in a plane corresponding to the plane of the prior photosensitive film. The Z-shift of this plane is achieved by a vertical shift of the CRT 120.

A first ray 121 emanating from the light spot on the screen 124 of the cathode-ray tube 120 is directed by suitable focusing means (not shown) onto a first photosensitive cell 122 after passing through the diapositive 125, and a second ray 121' emanating from the same light spot is similarly directed onto a second photosensitive cell 122' after passing through the other diapositive 125'. Instead of using two rays from one light spot, two CRT's could be provided with all their inputs connected in parallel, a first ray emanating from one CRT projected to the diapositive 125 and a second ray emanating from the other CRT projected to the diapositive 125'. The direction of rays 121, 121' and the disposition of the diapositives 125, 125' are so that corresponding areas of both diapositives 125, 125' are always scanned simultaneously. The output signals from the cells 122, 122' are fed into an X-parallax analyzer 130 which interprets any parallax between the two images of each detail represented by the input signals, such parallax providing an indication of the fact that the detail depicted in the area that is being scanned is elevated above a datum plane. The X-parallax analyzer 130 provides an output signal having an amplitude according to the amount of the parallax, which output signal is supplied via an amplifier 131 to a drive unit 132. The drive unit 132 shifts the CRT along the Z-direction by an amount such that the parallex detected by the analyzer 130 disappears. The scanning of the light spot across the screen 124 of the CRT 120, and thereby the scanning of the beams 121, 121' across the diapositives 125, 125' is achieved by deflecting the cathode-ray by means of a pair of X-deflection coils 133, as well as a pair of Y deflection coils 134. The X-deflection coils 133 are connected to an amplifier 135 which in turn is coupled to an X-deflection signal generator 136; the Y-deflection coils 134 are connected to an amplifier 137 which in turn is coupled to a Y-deflection signal generator 138.

A second cathode-ray tube 140 is provided to produce on its screen the image of a modified orthophotograph which image is projected by means of a suitable lens system (not shown) onto a photosensitive film 141 to form there the modified orthophotograph according the the present invention. The intensity of the cathode ray of the CRT 140 is controlled by the output of an amplifier 142 which receives an input signal from either of the photosensitive cells 122, 122', and which cathode ray is deflected by means of a pair of X-deflection coils 143, as well as a pair of Y-deflection coils 144. The Y-deflection coils 144 are connected to an amplifier 145 which in turn is coupled to the same Y-deflection signal generator 138 that is connected to the Y-deflection coil 134 of the CRT 120. As a result, the Y-deflection of the cathode ray of the CRT 140 is in phase with that of the CRT 120 and both Y-deflections are of similar amplitudes. The X-deflection coils 143 of the CRT 140 are connected to an amplifier 146, which is coupled to a modifier 147. One input of the modifier 147 is connected to the output of the X-parallax analyzer 130, while the other input of the modifier 147 is coupled to the same deflection signal generator 136 that is connected to the X-deflection system of the CRT 120. Again, the connection of the X-deflection systems of both CRT's to a common X-deflection signal generator provides synchronous scanning along the X-direction of the diapositives 125, 125' as well as of the film 141, and, disregarding the effect of the modifier 147, both cathode rays are deflected along the X-direction by similar extents. The function of the modifier 147 is to add to the X-deflection signal created by the generator 136 a signal that is obtained by multiplying the output signal from the X-parallax analyzer, i.e. the signal effecting the Z-shift of the CRT 120, by a value corresponding to the value cot A of the above equation.

The main advantage of this system consists in that the production of the modified orthophotograph is completely automatic and no errors can occur similar to the errors that are regularly made by the operator in watching a real optical model and performing the necessary Z-shift accordingly.

It is easy to expand the system described above in connection with FIG. 12 so that a true or unmodified orthophotograph is produced simultaneously with the modified orthophotograph. For this purpose, a third cathode-ray tube provided with another film at its screen is connected to the system with its Y-deflection coils coupled parallel to the respective inputs of the CRT 140, and with its intensity control input coupled to an amplifier similar to the amplifier 142 and which receives its input from the other one 122 of the photosensitive cells. The X-deflection coils of the third CRT are connected to a separate amplifier which is similar to the amplifier 146 and is directly coupled to the X-deflection signal generator 138.

APPLICATION OF THE MODIFIED ORTHOPHOTOGRAPH

(FIGS. 10 AND 11)

FIG. 10 shows a chart 97 with two similar images 98, 99 disposed in a fixed side-by-side relationship, the left-hand image 98 being an unmodified orthophotograph as it may have been produced on the prior art device according to FIG. 1, or on the right-hand film 30u of the apparatus shown in FIG. 8. In the terrain depicted in this unmodified orthophotograph the numeral 100u designates a shoreline, to the right of which a part of the sea can be seen. The terrain to the left of the shoreline 100u may be hilly, 103u designating the ridge of a chain of mountains extending along the shore. At 101u a bouy and at 102u an observation post located above sea level may be seen. The unmodified orthophotograph represents a photographic map with every detail in its true horizontal position. By taking the scale into consideration any horizontal distance can easily be measured in this orthophotograph.

The right-hand image 99 on the chart 97 is a modified orthophotograph which forms a stereopartner to the unmodified orthophotograph in the image 98 and which may have been produced on the device according to FIG. 4, 6 or 12 or on the left-hand film 30m of the apparatus shown in FIG. 8. Assuming that the horizontal displacement of the film in producing the modified orthophotograph has been performed in the direction of the abscissa of the images 98, 99, i.e. that the X-direction defined above is parallel to the abscissa, the terrain depicted in the image 99 is distorted according to differences in the elevation of the terrain only in respect of distances along the direction of the abscissa. As a result the distance M is unequal to the distance U, because the buoy and the observation post are at different altitudes, whereas any distance in the image 99 in a direction parallel to the ordinate, i.e. parallel to the Y-direction, is the same as the image 98. Assuming furthermore that the datum plane of the terrain is selected to be horizontal, preferably coincident with the sea level, the shape of the shoreline 100m in the images 99 is exactly the same as the shape of the shoreline 100u in the images 98 and, equally, the position of the buoy 101m with respect to the shoreline 100m in the images 99 is the same as the position of the buoy 101u with respect to the shoreline 100u in the image 98.

According to the differences in height, the line 103m representing the ridge of the chain of mountains in the image 99 has a shape and a position different from the shape and the position of the line 103u in the image 98. Similarly, the observation post 102m in the image 99 has a different position than in the image 98.

When viewing the unmodified orthophotograph in the image 98 stereoscopically together with the modified orthophotograph in the image 99 by means of an ordinary stereoscope, the formation of the terrain to the left of the shoreline will appear three-dimensional. Vertical distances, either elevations relative to the datum level or spot heights, may be measured easily and quickly by means of a stereoscopic depth scale printed on an overlay 106. The unmodified and modified orthophotographs have to be disposed in a fixed relationship such as on the chart 97, and the depth scale may comprise two groups of marks 107u, 107m spaced apart in the X-direction with the group 107u appearing over the unmodified orthophotograph and the other group 107m appearing over the modified orthophotograph. The distance between adjacent marks of one group is different from the corresponding distance in the other group. Each mark of any group corresponds to a mark of the other group, and each pair of marks so formed will produce a fused image that will appear vertically offset from the datum plane when viewed stereoscopically, the respective pairs thus produce apparent images at spaced levels above such plane. By properly annotating the marks of each of the groups 107u, 107m and by comparing the apparent height of a detail in question with the vertical scale so-formed, the elevation of the detail may be read off directly.

The combination of a true orthophotograph and its modified stereopartner makes it particularly easy to visualize the line of sight between two points. In the example according to FIG. 10, it may be of interest to determine whether the buoy 101u can be seen from the observation post 102u. For this purpose a straight line 104u connecting the observation post 102u and the buoy 101u can either be drawn directly on the image 98 or on a transparent sheet placed thereon and a similar straight line 104m connecting the observation post 102m and the buoy 101m formed on the image 99. Since the position of the observation post 102m in the modified orthophotograph in the image 99 is different from the position of the observation post 102u in the unmodified orthophotograph in the image 98, the lines 104m and 104u will have different angles with respect to the X-direction and therefore, the fused image of these lines under the stereoscope will appear inclined to the horizontal plane of the sea. Assuming that the terrain depicted in the two orthophotographs has the profile 105 shown in FIG. 11, the fused line of sight will appear to penetrate the chain of mountains, which fact indicates that the buoy 101u cannot be seen from the observation post 102u.

The complete area of view from a selected point situated in or above the terrain can similarly be mapped by pivoting two lines from the corresponding representations of such selected point in the unmodified and in the modified orthophotograph. The following examples are representative of the variety of applications for which this type of mapping may be used:

1. for military purposes, it is an obvious advantage to be able to produce quickly an accurate map of the field of view of an observer (or a radar set) from any friendly or enemy vantage point. Again, a stereoscopic model of the trajectory of a shell could be viewed in the same way to determine whether it will clear a hilltop;
2. for surveyors, the method will be valuable for preliminary location of triangulation or trilateration points. Even if there has been insufficient ground control to establish a datum plane in the terrain model, the relative orientation process will assure that the fields of view that are determined by this method will be correct over each model;
3. the field of view from a forest fire ranger's tower can be mapped before the tower is built, without visiting the site;
4. the location of microwave relay towers depending upon line-of-sight propagation will be assisted by this method.

The constant vertical and horizontal scale of the orthophoto-stereopartner combination renders it possible to device special tools for slope measurement which will require no calculation. A set of stereoscopic cones of varying angle can be constructed and the slope of a specific portion of terrain can easily be measured by comparison with these cones.

As mentioned above, true orthophotographs may be joined along any lines of common terrain points to form a mosaic with constant horizontal scale. Modified stereopartners may also be made into a continuous mosaic which can be viewed stereoscopically with the first mosaic. The resulting optical model of the terrain is continuous and constant in scale both vertically and horizontally. To make stereoscopic mosaics, the scan direction will preferably be parallel to a constant geographic direction through the whole mosaic, this direction also being the direction of the flight lines of the aircraft.

The above described method and apparatus is based on the assumption that the flying height of the airplane from which the aerial photographs are taken, is low enough to consider the reference base as a plane. This, however, is no longer true if the photographs are taken from a space craft and comprise a considerable portion of the entire surface of the earth or another spherical celestial body. In this latter case, the area of the film can remain flat and the horizontal displacement during the production of the modified orthophotograph can be replaced by a rotation or any suitable motion of the film that creates a maplike representation of the photographic detail. In the case of photography from a space craft that approaches the celestial body perpendicularly to the body surface, the two photographs may be taken along a common axis (i.e. the direction of approach), and at different distances from the surface. Such a pair of photographs is considered as a "stereopair" within the meaning of this term as used in the following claims. Except for the area at the nadir point below the craft, the two photographs will show parallaxes of the details due to their elevation. When properly brought into a common scale, these photographs thus form a stereopair.

In the above description only the common near-vertical aerial photographs have been considered, although the invention may be applied to nontopographic stereoscopic photography.

I claim:
1. A method of producing a modified orthophotograph for stereointerpretation, said method comprising
   a. obtaining from two photographs of an object forming a stereopair with each other the X-, Y- and Z-coordinates and information concerning the image of each detail of said object to generate data corresponding to a true orthophotograph of said object,
   b. modifying said data by varying the value of each X-coordinate of said data by an amount depending on the value of the corresponding said Z-coordinate and,
   c. forming said modified orthophotograph from said modified data.
2. A method according to claim 1, wherein said data obtaining and generating step comprises
   i. projecting said photographs to create a three-dimensional optical model of said object and to cause areas of one of said photographs small in comparison with the total area thereof to be successively projected onto successive portions of a photosensitive film, and
   ii. moving said film relative to said one photograph with a shift perpendicular to said film to effect at least optically apparent intersection of each one of said film portions with said optical model;
wherein said modifying step (b) comprises moving said film with a displacement tangential to said film, the amount of said displacement being dependent on the amount of said shift; and wherein said forming step (c) comprises exposing said film portions to the light projecting each said area of said one photograph.
3. A method according to claim 2, wherein said intersection is produced by forming said optical model at said film.
4. A method according to claim 2, wherein said intersection is produced by forming said optical model as a virtual one appearing in an optical system remote from said film and by causing said shift of said film to move said virtual optical model relatively to a mark in said optical system.
5. A method according to claim 2, wherein said exposing step comprises moving continuously an aperture defining said film portions in adjacent traces parallel to a scanning direction across said film and wherein said displacement is a translation in said scanning direction.
6. A method according to claim 2, wherein said tangential displacement of the film is a translation in a direction parallel to the image of the direction extending between the two positions from which the photographs were taken.
7. A method according to claim 1, wherein said data obtaining and generating step (a) comprises
   i. successively projecting from a first source of light corresponding areas of each of said photographs small in comparison with the total area thereof onto a respective one of a pair of photosensitive cells, said first source of light being placed at successively varying said X- and Y-coordinates in a first plane, said plane and both said photographs being parallel to one another,
   ii. determining the parallax in the X-direction between the two representations of each detail depicted in said corresponding areas to generate a signal representing each of said Z-coordinates and
   iii. applying said signal to shift said first light source perpendicularly to said photographs;
and wherein said forming step (c) comprises
   iv. varying the intensity of a second source of light in accordance with the output signal of one of said cells,
   v. placing said second source of light at each said modified X-coordinate and at each said Y-coordinate of a second plane,
   vi. exposing to said second source of light a photosensitive film disposed parallel to said second plane.
8. A method according to claim 7, wherein said X-coordinates define a direction parallel to the image of the direction extending between the positions from which the photographs were taken.

9. A method according to claim 1, wherein the amount of variation of the value of each X-coordinate is linearly related to the value of the corresponding said Z-coordinate.

10. A method according to claim 1, wherein the amount of variation of the value of each X-coordinate is logarithmically related to the value of the corresponding said Z-coordinate.